(12) United States Patent
Eleftheriou et al.

(10) Patent No.: US 7,436,615 B2
(45) Date of Patent: Oct. 14, 2008

(54) USING A MEASURED ERROR TO DETERMINE COEFFICIENTS TO PROVIDE TO AN EQUALIZER TO USE TO EQUALIZE AN INPUT SIGNAL

(75) Inventors: Evangelos S. Eleftheriou, Zurich (CH); Robert Allen Hutchins, Tucson, AZ (US); Jens Jelitto, Rueschlikon (CH); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 11/298,386

(22) Filed: Dec. 8, 2005

(65) Prior Publication Data
US 2007/0133115 A1    Jun. 14, 2007

(51) Int. Cl.
*G11B 5/35* (2006.01)
(52) U.S. Cl. ............................... 360/65; 360/31; 360/46
(58) Field of Classification Search ........................ None
See application file for complete search history.

(56) References Cited

U.S. PATENT DOCUMENTS

| | | | | | |
|---|---|---|---|---|---|
| 4,118,686 | A | * | 10/1978 | Lender | 375/292 |
| 5,230,007 | A | * | 7/1993 | Baum | 375/232 |
| 5,521,945 | A | * | 5/1996 | Knudson | 375/341 |
| 5,546,411 | A | | 8/1996 | Leitch et al. | |
| 5,574,602 | A | | 11/1996 | Baca et al. | |
| 5,610,776 | A | * | 3/1997 | Oh | 360/53 |
| 5,644,597 | A | * | 7/1997 | Ueda | 375/232 |
| 5,737,365 | A | | 4/1998 | Gilbert et al. | |
| 5,978,162 | A | * | 11/1999 | Behrens et al. | 360/53 |
| 6,160,673 | A | * | 12/2000 | Izumi et al. | 360/46 |
| 6,208,481 | B1 | * | 3/2001 | Spurbeck et al. | 360/65 |
| 6,466,616 | B1 | | 10/2002 | Stenstrom et al. | |
| 6,661,594 | B2 | * | 12/2003 | Satoh et al. | 360/65 |

(Continued)

FOREIGN PATENT DOCUMENTS

JP    61145766 A    7/1986

*Primary Examiner*—Hoa T. Nguyen
*Assistant Examiner*—Dismery Mercedes
(74) *Attorney, Agent, or Firm*—David W. Victor; Konrad Raynes & Victor LLP (57) ABSTRACT

Provided are a read channel, storage drive and method using a measured error to determine coefficients to provide to an equalizer to use to equalize an input signal. A read channel is incorporated in a storage device to process signals read from a storage medium. An equalizer uses coefficients to equalize input read signals to produce equalizer output signals. A detector processes adjusted equalizer output signals to determine output values comprising data represented by the input read signals. An equalizer adaptor is enabled to provide a reference measured error and coefficients used to produce the adjusted equalizer signals that are associated with the reference measured error. The equalizer adaptor computes new equalizer coefficients to use to equalize input read signals that result in a new measured error from the detector and computes a new measured error for the new equalizer coefficients. The equalizer adaptor determines whether the new measured error is degraded with respect to the reference measured error and saves the new equalizer coefficients and the new measured error in response to determining that the new measured error is not degraded with respect to the reference measured error. The equalizer adaptor provides the equalizer coefficients associated with the reference measured error to the equalizer to use to equalize input read signals in response to determining that the new measured error is degraded with respect to the reference measured error.

10 Claims, 4 Drawing Sheets

U.S. PATENT DOCUMENTS

| | | |
|---|---|---|
| 6,674,707 B2 | 1/2004 | Ogura et al. |
| 6,763,074 B1 | 7/2004 | Yang |
| 6,765,741 B2 * | 7/2004 | Berman et al. ............... 360/65 |
| 6,804,695 B1 * | 10/2004 | Hsu ........................... 708/322 |
| 6,862,316 B2 | 3/2005 | Tomisato et al. |
| 6,900,964 B2 | 5/2005 | Argumedo et al. |
| 6,907,064 B1 * | 6/2005 | Tokunaga et al. ........... 375/232 |
| 7,012,772 B1 * | 3/2006 | Vis ............................ 360/46 |
| 7,016,405 B2 * | 3/2006 | Horng et al. ................ 375/232 |
| 2004/0190649 A1 * | 9/2004 | Endres et al. ............... 375/326 |
| 2004/0202061 A1 | 10/2004 | Reasoner et al. |
| 2005/0271137 A1 * | 12/2005 | Kolze et al. ................ 375/233 |

* cited by examiner

USING A MEASURED ERROR TO DETERMINE COEFFICIENTS TO PROVIDE TO AN EQUALIZER TO USE TO EQUALIZE AN INPUT SIGNAL

BACKGROUND OF THE INVENTION

1. Field of the Invention

The present invention relates to a system and device for using a measured error to determine coefficients to provide to an equalizer to use to equalize an input signal.

2. Description of the Related Art

Magnetic tape cartridges include magnetic tape to store data to be saved and read back at a subsequent time. A magnetic tape drive writes the data to magnetic tape, typically as a set of parallel tracks, and subsequently a magnetic tape drive reads back the data. To read back the data, a magnetic tape drive typically comprises parallel read heads to read each of the parallel tracks, a drive system for moving a magnetic tape with respect to the read heads such that the read heads may detect magnetic signals on the magnetic tape, and a read channel for digitally sampling magnetic signals sensed by the read heads and providing digital samples of the magnetic signals. The digital samples are then decoded into data bits, and the data bits from the parallel tracks are combined into the data that was saved. The read channel typically requires an equalizer for each of the read heads to compensate for the change in the signal due to the magnetic recording properties of the write head, the magnetic tape, and the read head. Magnetic tape cartridges may be interchanged between tape drives, such that a magnetic tape written on one tape drive will be read by another tape drive. Variation in the response of the read heads to the variously written magnetic tapes may result in unacceptably poor read back of the recorded signals.

Adaptive equalizers implemented in magnetic tape drives solve a set of equations to find the equalizer characteristic that reduces the error between the desired and actual amplitudes. Thus, the equalizer might be computed at the beginning of use with respect to a magnetic tape, or recomputed a few times during use. Further, the desired amplitudes may be difficult to estimate. Hence, in many instances, the desired amplitudes are best estimated by employing a signal having known characteristics, such as a synchronization signal, or a data set separator signal, and not the random data signals.

In magnetic tape, the recording characteristics may not only vary from track to track, but may as well vary in a continuous fashion along a track or tracks. Thus, a selected equalizer characteristic, although satisfactory at the beginning or at some specific track location of a magnetic tape, may lead to an increase in data read errors at some point along the track. Further, different tape drives from different manufacturers may write data sets to a tape cartridge having different magnetic properties, i.e., different signal-to-noise ratios. Moreover, the tape drive is required to read tapes that are manufactured by several different vendors, all having slightly different magnetic recording properties. Yet further, data sets may have been written to the tape cartridge under a wide range of environmental conditions, which differ from the conditions at the time the data is read.

To address the problems mentioned above, a least mean squares (LMS) algorithm can be used to adjust the coefficients of an equalizer that operates on the read-back signal at the output of the analog-to-digital (A/D) converter and provides continuous adjustment of the equalizer characteristic. However, in current implementations, a relatively large number of tap coefficients of the equalizer, must be fixed, e.g. as many as 30-40%, in order to ensure stable operation of the adaptive algorithm. This limits the ability of the equalizer to fully adapt to changing conditions. If a tape drive is operating in an environment where data sets can have significantly different magnetic reporting properties; it is desirable to have most equalizer coefficients adapting to the read-back signal.

SUMMARY

Provided are a read channel, storage drive and method using a measured error to determine coefficients to provide to an equalizer to use to equalize an input signal. A read channel is incorporated in a storage device to process signals read from a storage medium. An equalizer uses coefficients to equalize input read signals to produce equalizer output signals. A detector processes adjusted equalizer output signals to determine output values comprising data represented by the input read signals. An equalizer adaptor is enabled to provide a reference measured error and coefficients used to produce the adjusted equalizer signals that are associated with the reference measured error. The equalizer adaptor computes new equalizer coefficients to use to equalize input read signals that result in a new measured error from the detector and computes a new measured error for the new equalizer coefficients. The equalizer adaptor determines whether the new measured error is degraded with respect to the reference measured error and saves the new equalizer coefficients and the new measured error in response to determining that the new measured error is not degraded with respect to the reference measured error. The equalizer adaptor provides the equalizer coefficients associated with the reference measured error to the equalizer to use to equalize input read signals in response to determining that the new measured error is degraded with respect to the reference measured error.

DETAILED DESCRIPTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
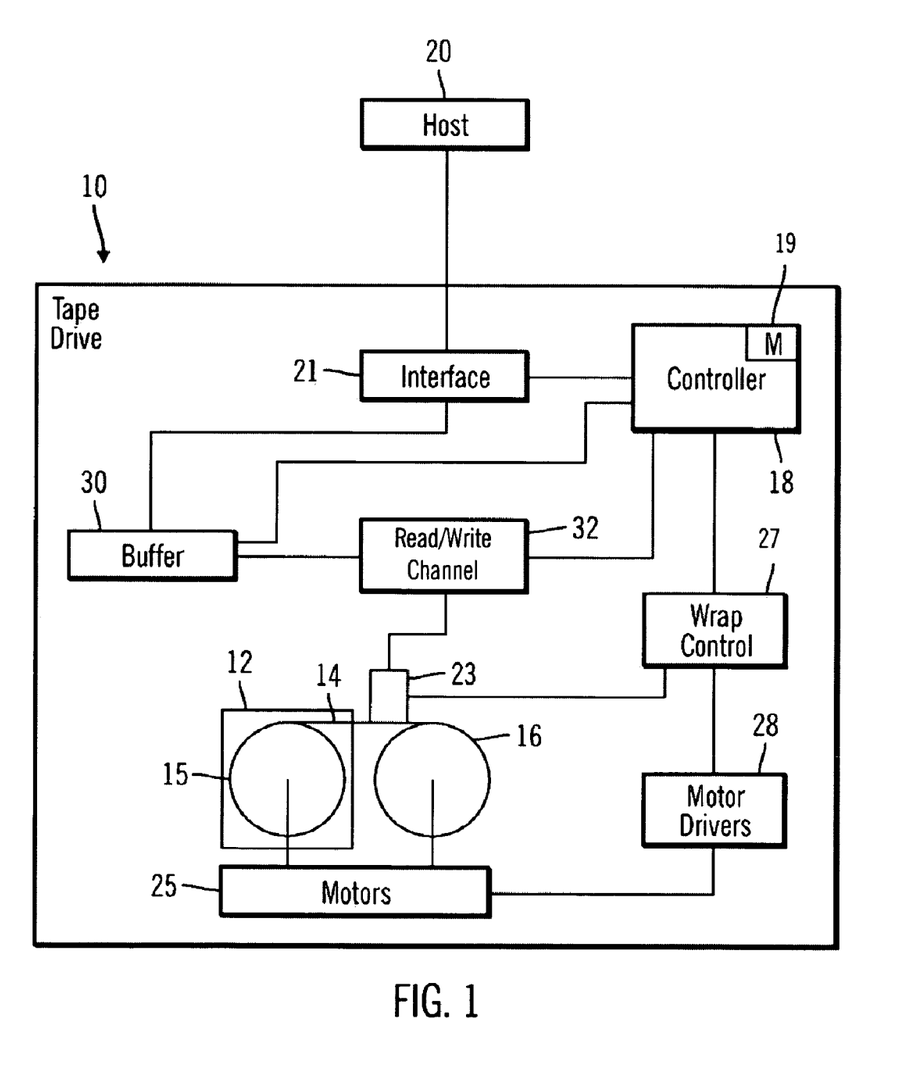
FIG. 1 illustrates an embodiment of a tape drive.

FIG. 1 illustrates an embodiment of a magnetic tape drive 10. The magnetic tape drive provides a means for reading and writing information with respect to a magnetic tape 14 of a magnetic tape cartridge 12. Magnetic tape cartridges include a magnetic tape storage medium to store data to be saved and read at a subsequent time. Further, the magnetic tape cartridges may be interchanged between tape drives, such that a magnetic tape written on one tape drive will be read by another tape drive. The magnetic tape cartridge 12 comprises a length of magnetic tape 14 wound on one or two reels 15, 16.

A single reel magnetic tape cartridge 12 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive. In alternative embodiments, additional tape formats that may be used include Digital Linear Tape (DLT), Digital Audio Tape (DAT), etc.

The magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc. The magnetic tape cartridge 12 may be inserted in the magnetic tape drive 10, and loaded by the magnetic tape drive so that one or more read and/or write heads 23 of the recording system read and/or write information in the form of signals with respect to the magnetic tape 14 as the tape is moved longitudinally by motors 25 which rotate the reels 15, 16. The magnetic tape typically comprises a plurality of parallel tracks, or groups of tracks. In certain tape formats, such as the LTO format, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a read/write channel 32, as is known to those of skill in the art.

The tape drive 10 system further includes motors 25 and reels 15, 16 to move the magnetic tape 14 with respect to the read head(s) 23 such that the read head(s) may detect magnetic signals on the magnetic tape. A read channel of the read/write channel 32 digitally samples the magnetic signals detected by the read head(s) to provide digital samples of the magnetic signals for further processing.

Figure 2:
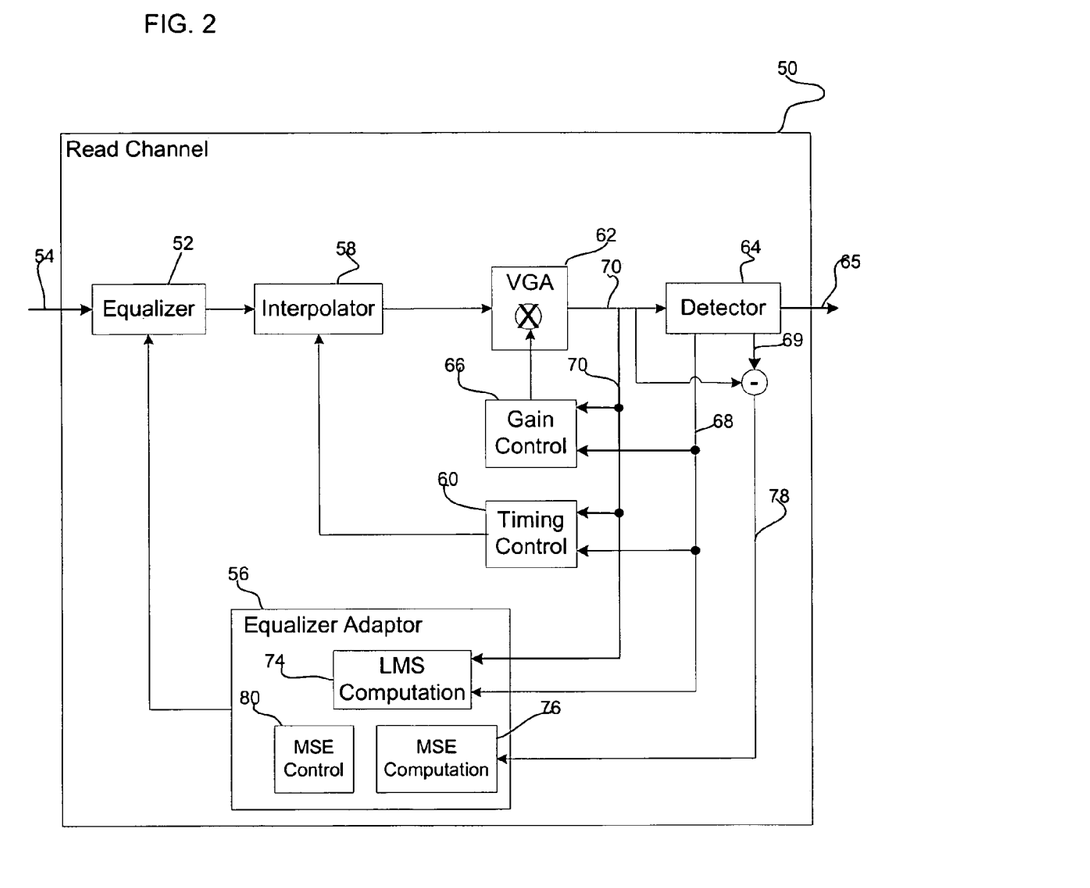
FIG. 2 illustrates embodiments of a read channel in the tape drive.

FIG. 2 illustrates an embodiment of a portion of a read channel of the read/write channel 32 of FIG. 1 including an embodiment of an equalizer adaptor that uses measured errors to adjust the coefficients used by the equalizer. In embodiments where the read channel may concurrently read a plurality of parallel tracks, the read/write channel 32 may comprise a plurality of read channels, in which some of the components may be shared.

FIG. 2 illustrates an embodiment of certain, but not all, of the components of a read channel 50 to provide digital samples of the magnetic signals sensed by the read head 23. An equalizer 52 receives a signal 54 from an analog-to-digital converter (ADC) (not shown), which converts analog signals read from tape to digital samples that can be processed by the equalizer 52. In one embodiment, the equalizer 52 may comprise a finite impulse response (FIR) filter having adjustable tap coefficients. The equalizer 52 processes the digital samples to achieve a desired signal characteristic at the equalizer output, thus compensating for differences in the signal due to the magnetic recording properties of the write head, the magnetic tape, and the read head. The processing is based on a series of specific functions employing tap coefficients, that may be adapted by an equalizer adaptor 56. The equalized digital samples output by the equalizer 52 are supplied to an interpolator 58 comprising a timing circuit to provide signal samples that are spaced by a bit or symbol interval.

Determination of the information content of the magnetic signals requires determining the timing or position of magnetic transitions of the magnetic signals. Typically, the sample signals 54 are taken asynchronously with respect to the clock used to write the data on the magnetic tape. The interpolator 58 interpolates the asynchronous samples into a set of samples that can be considered to be synchronous with the write clock or with the positions of the magnetic recording transitions. A timing control component 60 may include phase-error generation logic, a phase locked loop (PLL) and phase interpolation logic to derive a reference for the interpolator 58 to provide the synchronous samples. A variable gain amplifier circuit (VGA) 62, which may comprise a custom designed logic circuit, adjusts the gain of the signals from the interpolator 58 to scale the samples of the gain adjusted synchronous signal 70 to optimal levels.

A detector 64 receives the gain adjusted synchronous signal 70 from the VGA 62 to determine the data information represented by the digital samples. The determined data-information which is represented by a stream of detected bits (i.e., zeros and ones) is outputted as signal 65 for further processing. In one embodiment the detector 64 may be a threshold device followed by additional logic to determine the data information. Besides determining the data information, the detector 64 may generate an estimate of the synchronized, gain adjusted equalizer output signal using the threshold device and provide this estimate as output value 68. In another embodiment the detector 64 may be a sequence detector. This sequence detector may provide the data information and may additionally generate an estimate of the synchronized, gain adjusted equalizer output signal using (tentative) decisions from the detector trellis and provide this estimate as output value 68. Similarly, the sequence detector may generate another estimate of the synchronized, gain adjusted equalizer output signal using (tentative) decisions from a different location in the detector trellis and provide this estimate as output value 69. The output value 68 from the detector 64, i.e., the estimate of the desired value, and the gain adjusted synchronous signal 70 is provided to a gain control 66 that calculates an error signal to adjust the VGA circuit 62. Similarly, the output value 68 from the detector 64 and the gain adjusted synchronous signal 70 are used by the timing control 60 to adjust the interpolator 58. Further, the output value 68 from the detector 64 and the gain adjusted synchronous signal 70 are provided to a least mean squares (LMS) computation 74 component of the equalizer adaptor 56 to generate an error signal to adjust the coefficients used by the equalizer 52. In an alternative embodiment, the LMS computation 74 may use the detector output 68 and the output from the interpolator 58 to determine an error used to adjust the coefficients.

The error signals calculated by the equalizer adaptor 56, the gain control 66, and the timing control 60 are signed values determining the amplitude and the direction of the error. A simplified version of an amplitude independent error signal may only use the sign of the error signal to indicate the direction of the error.

In one embodiment, the equalizer 52 may adjust the input signal 54 by using a finite impulse response (FIR) filter producing output ($Z_n$) based on coefficients ($c_{i,n}$) supplied by the LMS computation 74, adjusted by the error signal comprising the difference of the output of the detector 68 (desired value) and the gain adjusted synchronous signal 70 or the output from the interpolator 58. Equation (1) describes the generation of an equalized signal ($Z_n$) using N samples ($x_{n-i}$) from input 54 and N filter coefficients ($c_{i,n}$). The coefficients ($c_{i,n}$) comprise an index n denoting the time cycle and an index i denoting the coefficient number, $$Z_n = \sum_{i=0}^{N-1} c_{i,n} x_{n-i}. \quad (1)$$

The equalizer adaptor 56 adjusts coefficients ($c_{i,n}$) according to the error signal ($e_n$) calculated from the detector output 68 and the gain adjusted synchronous signal 70 (or the output from the interpolator 58). A programmable parameter ($\alpha$) controls the speed at which the coefficients converge, i.e., the larger alpha ($\alpha$) the faster the convergence. In one embodiment, the LMS computation 74 calculates adjusted coefficients ($c_{i,n}$) by using the LMS algorithm shown below in equation (2). The adjusted coefficients are then used by the equalizer 52 in equation (1) to calculate the equalized signal ($Z_n$).

$$c_{i,n+1} = c_{i,n} - \alpha e_n x_{n-i}, \text{ where } i=0, 1 \ldots N-1 \quad (2)$$

In certain embodiments, because some small amount of interaction exists between the equalizer and the timing control loops, the LMS computation 74 may need to be constrained in order to avoid possible ill-convergence problems. This can be achieved by fixing (i.e., not adjusting) some of the equalizer coefficients ($c_{i,n}$). Equation (3) below shows how the coefficient ($c_{i,n}$) may be calculated, such that certain coefficients are fixed to their current value if they are at an index (i) that is a member of the set of fixed coefficients (I).

$$c_{i,n+1} = \begin{cases} c_{i,n} - \alpha e_n x_{n-i}, & i \notin I \\ c_{i,n}, & i \in I \end{cases} \quad (3)$$

Thus, if the coefficient is a member of the set of fixed coefficients (I), the coefficient for the time cycle (n+1), $c_{i, n+1}$, is set to the coefficient $c_{i, n}$, from the previous time cycle (n), i.e., the tap coefficient is fixed. If the coefficient ($c_{i,n}$) is not a member of the set of fixed coefficients, then it is adjusted. The designer of the read channel 50 may determine the number of coefficients to fix based on empirical testing.

The equalizer adaptor 56 further includes a Mean Squared Error (MSE) computation 76 component used to compute an MSE from the error signal 78 comprising the difference of the output 69 and the gain adjusted synchronous signal 70. An MSE control 80 uses the measured MSE value to determine whether to use the recently computed coefficients from the LMS computation 74 or to reuse old coefficients computed previously. The MSE may be computed as an averaged value of the squared value of the detector error signal 78 (err) according to equation (4) below:

$$mse(n) = \alpha \cdot err^2(n) + (1-\alpha) * mse(n-1). \quad (4)$$

The mse(n−1) indicates the MSE value from the previous time cycle, and (err(n)) provides the current detector error signal 78. The variable ($\alpha$) comprises a weight factor defining a time constant for the error averaging operation, and may comprise $1/1024 = 0.00098$. The MSE is a representation of the inverse of the signal-to-noise ratio (SNR), such that if the MSE decreases, then equalizer adaptation has improved, whereas if the MSE increases, then there has been a degradation of performance.

Figure 3:
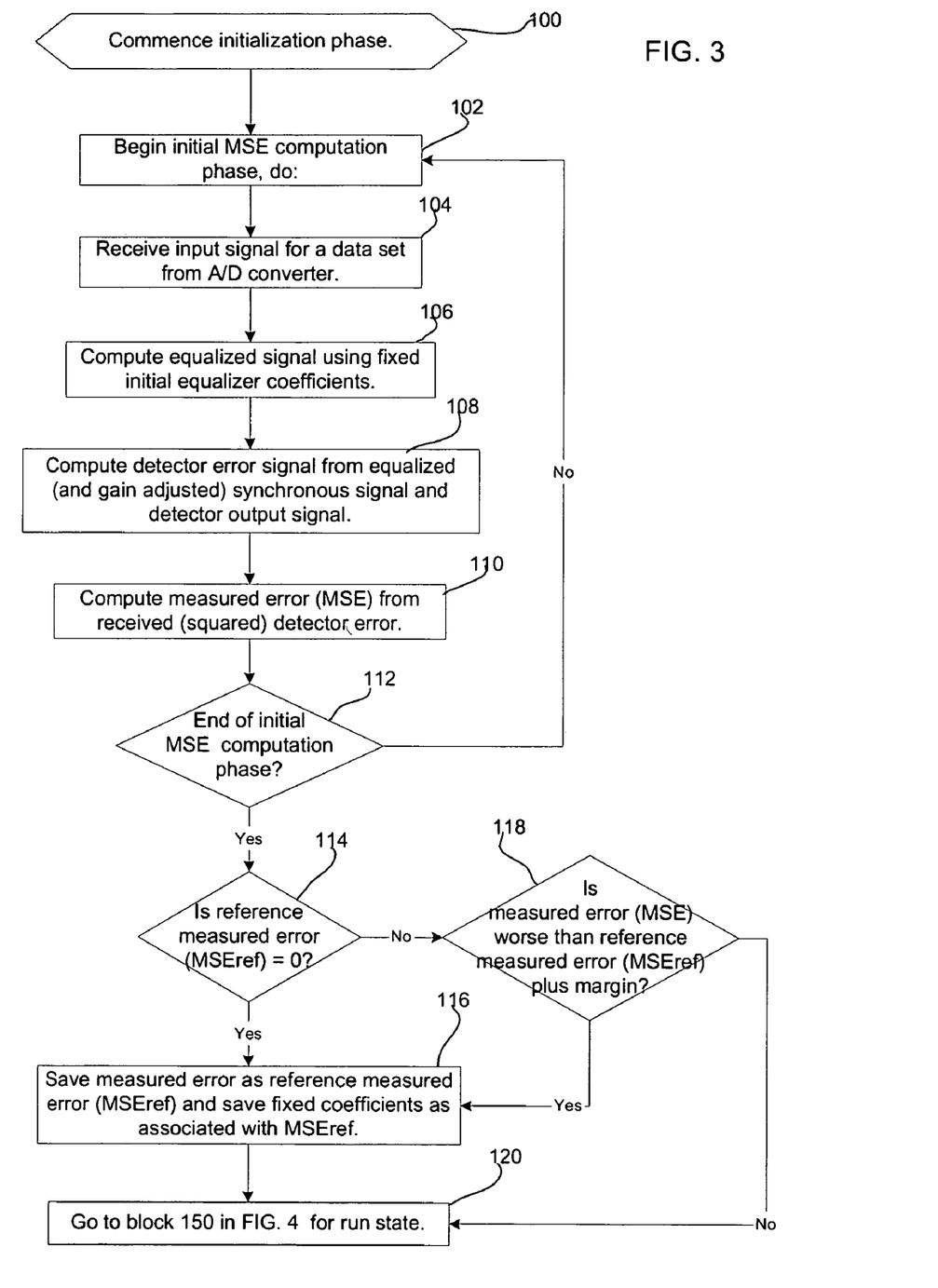
FIGS. 3 and 4 illustrate an embodiment of operations to determine coefficients to provide to an equalizer.
Figure 4:
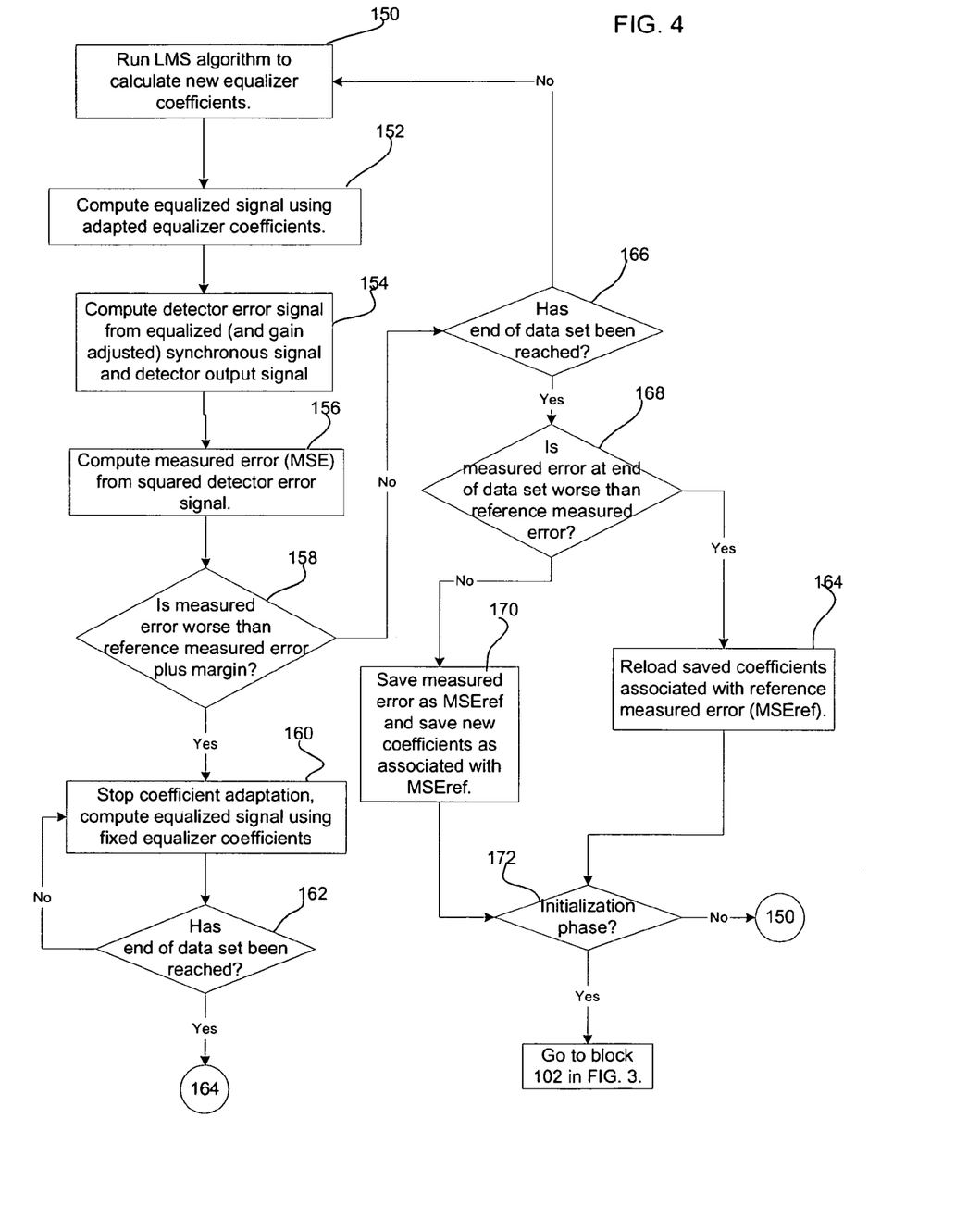

FIGS. 3 and 4 illustrate an embodiment of operations performed by the equalizer adaptor 56 components, including the MSE control 80, to determine the coefficients that will be provided to the equalizer 52 to adjust the input signal 54. FIG. 3 illustrates an embodiment of operations the MSE control 80 performs in an initialization phase to determine an initial estimate of the MSE which is used as a qualifier to select the best possible equalizer coefficients to provide to the equalizer 52. As discussed the MSE and SNR reflect the quality of the gain adjusted synchronous signal 70 that is provided to the detector 64. The initialization phase of FIG. 3 may be performed when starting to read data or when reading a new data set from the tape medium to determine an initial estimate of the measured error (e.g. MSE). In response to beginning the initialization phase (at block 100), an MSE computation phase begins (at block 102) to perform the following operations. The MSE computation phase may be performed a fixed number of cycles associated with reading a fixed number of input signals 54. Upon receiving (at block 104) an input signal 54, the MSE control 80 provides fixed (initial) tap coefficients to the equalizer 52 to use to compute (at block 106) an equalized signal. Upon computing (at block 108) the detector error signal 78 based on the difference of the output 69 and the gain adjusted synchronous signal 70 equalized using the fixed coefficients, the MSE computation 76 calculates (at block 110) a measured error (MSE) from the detector error signal 78.

If (at block 112) the end of the initial measured error (MSE) computation phase is not yet reached, control proceeds (at block 112) back to block 102. In one embodiment, the end of the initial measured error (MSE) computation phase can be determined by evaluating a counter which counts the number of cycles that have been spent in the initial computation phase loop. If the counter reaches a predefined maximum value, convergence of the initial MSE computation is assumed and the end of the initial measured error (MSE) computation phase is declared. If the end of the initial MSE computation phase is reached, then control proceeds to block 114.

If (at block 114) a saved reference measured error (MSEref) is zero, i.e., the computed initial MSE is the first computed MSE, then the measured error (MSE) provided at block 110 is saved (at block 116) as the reference measured error (MSEref) and the fixed equalizer coefficients are saved as associated with the reference measured error (MSEref). In one embodiment, if (at block 118) the recently measured error (MSE) is worse, i.e., greater than, the reference measured error (MSEref) plus some MSE margin (delta) (which means the SNR resulting from the equalizer 52 output has degraded beyond the MSE margin), then control proceeds to block 116 to save the recently measured error (MSE) as the reference measured error (MSEref) and the fixed coefficients associated with that updated reference measured error (MSEref) in order to deal with varying SNR conditions in a new data set. If the measured error (MSE) has not degraded or after saving the recently measured error (MSE) as the reference measured error (MSEref), then control proceeds to block 150 in FIG. 4 (at block 120) to adjust the coefficients during a runtime mode to provide to the equalizer 52.

FIG. 4 illustrates an embodiment of operations performed by the equalizer adaptor 56 during a runtime mode to provide the equalizer 52 with coefficients to use to equalize the input signal 54. At block 150, the LMS algorithm 74 calculates new coefficients based on the gain adjusted synchronous signal 70 (or output signal from the interpolator 58) and output value 68 from the detector 64. The equalizer 52 uses (at block 152) the new equalizer coefficients to adjust the input signal 54 to produce an equalized signal for the interpolator 58 to send to the detector 64. Upon computing (at block 154) the detector error signal 78 based on the difference of the output 69 and the gain adjusted synchronous signal 70, the MSE computation 76 calculates (at block 156) a measured error (MSE) from the detector error signal 78. If (at block 158) the measured error (MSE) is worse, i.e., MSE is greater than the reference measured error (MSEref) plus some MSE margin (delta), then the LMS adaptation is stopped and the current equalizer coefficients are fixed and used to equalize the input signal 54 (at block 160). If (at block 162) the end of a data set has been detected, which may comprise a signal being generated within the tape drive, then control proceeds to the MSE control 80 which reloads (at block 164) the previously saved equalizer coefficients associated with the current reference measured error (MSEref) to be used by the equalizer 52. Otherwise, the current fixed equalizer coefficients are used to equalize the input signal 54 (at block 160).

If (at block 158) the measured error signal has not worsened beyond some margin (delta) and if (at block 166) the end of a data set has been detected, which may comprise a signal being generated within the tape drive, then a determination is made (at block 168) whether the measured error (MSE) at the end of the data set is worse than the reference referenced measured error (MSEref), i.e., equalizer performance has degraded. As discussed, the SNR may be determined to be degraded if the currently measured error (MSE) is greater than the reference measured error (MSEref).

If (at block 168) the measured error (MSE) has not degraded, then the MSE control 80 saves (at block 170) the measured error (MSE) as the new reference measured error (MSEref) and saves the new equalizer coefficients as associated with the new reference measured error (MSEref).

If (at block 168) the measured error (MSE) has degraded, i.e., the measured error (MSE) is greater than the reference measured error (MSEref), then the MSE control 80 reloads (at block 164) the previously saved equalizer coefficients associated with the current reference measured error (MSEref) to be used by the equalizer 52. In this way, the coefficients with the best possible measured error (MSE) are used.

If (at blocks 170 or 164) the equalizer coefficients have been saved or previous coefficients have been reloaded, then a determination is made (at block 172) as to whether the initialization phase is to be performed at the beginning of a next data set to use fixed coefficients to re-initialize the measured error (MSE) value, or whether the runtime mode continues to have the LMS computation 74 calculate new coefficients to use without re-initializing the measured error (MSE) value. In one embodiment, the administrator may set a variable indicating whether to continue with the runtime mode or proceed back to the initialization phase to recalculate the MSE to use when beginning to process a next data set. For instance, if the administrator determines that it is likely that data sets are written by different tape drives or under different environmental conditions, then the administrator may select to do initialization at the start of each data set to re-initialize the reference MSE (MSEref) based on the anticipated new conditions. In this case, control proceeds to block 102 in FIG. 3 to perform an initial MSE computation at the beginning of the next data set. Alternatively, if the administrator determines that the same tape drive is likely used and environmental conditions remain relatively unchanged, then it might be advantageous not to recalculate the reference measured error (MSEref). In this case, control proceeds to runtime mode (at block 150) directly.

Described embodiments provide techniques to determine whether to use previously calculated equalizer coefficients or newly calculated equalizer coefficients to equalize read input signals based on whether the measured error (MSE) of the gain adjusted synchronous signal 70 for the newly calculated coefficients results or does not result in performance degradation.

The described components of the read channel 50 and equalizer-adaptor 56 comprise discrete logic, ASIC (application specific integrated circuit), FPGA (field programmable gate array), custom processors, etc.

The described components of the read channel 50 and the operations of the equalizer adaptor 56 described with respect to FIGS. 3 and 4 may also be implemented in subroutines in programs or other software implementations executed by a processor. Such programs implementing the operations of the equalizer adaptor circuit 56, such as those operations shown in FIGS. 3 and 4, may be implemented in a computer readable medium, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

Components in FIGS. 1 and 2 shown as separate components may be implemented in a single circuit device or functions of one illustrated component may be implemented in separate circuit devices.

Those of skill in the art will understand that changes may be made with respect to the components illustrated herein. Further, those of skill in the art will understand that differing specific component arrangements may be employed than those illustrated herein.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing signals read from a storage medium, comprising:

using coefficients to equalize input read signals to produce equalizer output signals;

processing adjusted equalizer output signals to determine output values comprising data represented by the input read signals;

providing a reference measured error and coefficients used to produce the adjusted equalizer signals that are associated with the reference measured error;

computing new equalizer coefficients to use to equalize input read signals that result in a new measured error from a detector;

computing a new measured error for the new equalizer coefficients;

determining whether the new measured error is degraded with respect to the reference measured error;

saving the new equalizer coefficients and the new measured error in response to determining that the new measured error is not degraded with respect to the reference measured error;

providing coefficients associated with the reference measured error to an equalizer to use to equalize input read signals in response to determining that the new measured error is degraded with respect to the reference measured error; and saving the new equalizer coefficients and the new measured error as the reference measured error in response to detecting an end of a data set and to detecting an improvement of the new measured error over the reference measured error.

2. The method of claim 1, wherein the measured errors are based on adjusted equalizer output signals and output values from the detector.

3. The method of claim 1, wherein the measured errors comprise mean squared values of errors measured as a difference of an input to the detector and an output from the detector, and wherein the measured errors correspond to a signal-to-noise ratio at the input to the detector.

4. The method of claim 1, further comprising:
providing fixed coefficients to the equalizer to use to equalize the read input signals for an initial measured error computation phase; and
computing the measured error from the equalized input signal.

5. The method of claim 1, wherein the measured error is based on a difference of an input and output of the detector, and wherein the new coefficients are calculated using the output of the detector.

6. A method for processing signals read from a storage medium, comprising:
using coefficients to equalize input read signals to produce equalizer output signals;
processing adjusted equalizer output signals to determine output values comprising data represented by the input read signals;
providing a reference measured error and coefficients used to produce the adjusted equalizer signals that are associated with the reference measured error;
computing new equalizer coefficients to use to equalize input read signals that result in a new measured error from a detector;
computing a new measured error for the new equalizer coefficients;
determining whether the new measured error is degraded with respect to the reference measured error;
saving the new equalizer coefficients and the new measured error in response to determining that the new measured error is not degraded with respect to the reference measured error;
providing coefficients associated with the reference measured error to an equalizer to use to equalize input read signals in response to determining that the new measured error is degraded with respect to the reference measured error; and
stopping equalizer adaptation and providing fixed equalizer coefficients to the equalizer to use to equalize the input read signals until an end of a data set is detected in response to determining that the new measured error is degraded with respect to the reference measured error.

7. A method for processing signals read from a storage medium, comprising:
using coefficients to equalize input read signals to produce equalizer output signals;
processing adjusted equalizer output signals to determine output values comprising data represented by the input read signals;
providing a reference measured error and coefficients used to produce the adjusted equalizer signals that are associated with the reference measured error;
computing new equalizer coefficients to use to equalize input read signals that result in a new measured error from a detector;
computing a new measured error for the new equalizer coefficients based on the input signals equalized using fixed coefficients;
determining whether the new measured error is degraded with respect to the reference measured error;
saving the new equalizer coefficients and the new measured error in response to determining that the new measured error is not degraded with respect to the reference measured error;
providing coefficients associated with the reference measured error to an equalizer to use to equalize input read signals in response to determining that the new measured error is degraded with respect to the reference measured error;
saving the new measured error as the reference measured error and saving the fixed coefficients to use to equalize the input signal in response to determining that there exists no value for the reference measured error;
determining whether the new measured error is degraded with respect to the reference measured error in response to using the fixed coefficients for an initial measured error computation phase; and
saving the new measured error as the reference measure error and saving the fixed coefficients to use to equalize the input signal in response to determining that the new measured error is degraded beyond some margin.

8. A method for processing signals read from a storage medium, comprising:
using coefficients to equalize input read signals to produce equalizer output signals;
processing adjusted equalizer output signals to determine output values comprising data represented by the input read signals;
providing a reference measured error and coefficients used to produce the adjusted equalizer signals that are associated with the reference measured error;
computing new equalizer coefficients to use to equalize input read signals that result in a new measured error from a detector;

computing a new measured error for the new equalizer coefficients;

determining whether the new measured error is degraded with respect to the reference measured error;

saving the new equalizer coefficients and the new measured error in response to determining that the new measured error is not degraded with respect to the reference measured error, wherein the operations of calculating the new coefficients, using the new coefficients to equalize input read signals to produce equalizer output signals, and determining whether the new measured error is degraded are performed until detecting an end of a data set;

providing coefficients associated with the reference measured error to an equalizer to use to equalize input read signals in response to determining that the new measured error is degraded with respect to the reference measured error; and determining whether to stop equalizer adaptation and to provide fixed coefficients to the equalizer to use to equalize the input signal in response to determining that the new measured error is degraded with respect to the reference measured error beyond some margin.

9. The method of claim 8, further comprising:

determining whether the new measured error is degraded;

saving the new coefficients and the new measured error as reference measured error when the measured error is not degraded with respect to the reference measured error; and reloading the previous coefficients and the previous measured error as reference measured error when the measured error is degraded with respect to the reference measured error.

10. The method of claim 9, wherein a user settable parameter indicates whether to use the fixed coefficients for an initial measured error computation phase to process input signals from the next data set.

* * * * *